(12) United States Patent
Mohr et al.

(10) Patent No.: US 12,326,554 B2
(45) Date of Patent: *Jun. 10, 2025

(54) COMPACT GALVANOMETER MIRROR DESIGN

(71) Applicant: Luminar Technologies, Inc., Orlando, FL (US)

(72) Inventors: Daniel Aaron Mohr, St. Paul, MN (US); Kevin A. Gomez, Eden Prairie, MN (US)

(73) Assignee: LUMINAR TECHNOLOGIES, INC., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,773

(22) Filed: Jul. 31, 2023

(65) Prior Publication Data

US 2023/0375826 A1 Nov. 23, 2023

Related U.S. Application Data

(63) Continuation of application No. 17/017,503, filed on Sep. 10, 2020, now Pat. No. 11,714,277.

(60) Provisional application No. 62/898,455, filed on Sep. 10, 2019.

(51) Int. Cl.
| | |
|---|---|
| *G02B 26/08* | (2006.01) |
| *G01S 7/481* | (2006.01) |
| *G02B 5/09* | (2006.01) |
| *G02B 26/10* | (2006.01) |
| *G02B 26/12* | (2006.01) |

(52) U.S. Cl.
CPC .......... *G02B 26/101* (2013.01); *G01S 7/4817* (2013.01); *G02B 5/09* (2013.01); *G02B 26/124* (2013.01)

(58) Field of Classification Search
USPC ......... 359/199.3, 202.1, 221.1, 221.2, 223.1, 359/226.2
See application file for complete search history.

(56) References Cited

U.S. PATENT DOCUMENTS

| | | | |
|---|---|---|---|
| 9,063,549 B1 | 6/2015 | Pennecot et al. | |
| 11,714,277 B2 * | 8/2023 | Mohr .................. | G02B 5/09 |
| | | | 359/199.3 |
| 2010/0118363 A1 | 5/2010 | Shigematsu et al. | |
| 2018/0284237 A1 | 10/2018 | Campbell et al. | |
| 2018/0372874 A1 | 12/2018 | Lipson et al. | |
| 2019/0033460 A1 | 1/2019 | Lipson | |
| 2019/0302264 A1 | 10/2019 | Smits | |

* cited by examiner

*Primary Examiner* — Euncha P Cherry
(74) *Attorney, Agent, or Firm* — HOLZER PATEL DRENNAN

(57) ABSTRACT

Implementations described and claimed herein provide a mechanically-scanning 3-dimensional light detection and ranging (3D LiDAR) system including a galvo mirror attached to an armature of a galvanometer to reflect a light signal generated by a light generator, the galvanometer comprising at least one permanent magnet, at least one coil configured to carry current to move the armature, wherein the galvo mirror is configured to reflect the light signal generated by the light generator towards a one or more objects and the galvo mirror is further configured to reflect light signal reflected from the one or more objects towards a light detector.

14 Claims, 7 Drawing Sheets

COMPACT GALVANOMETER MIRROR DESIGN

CROSS REFERENCE TO RELATED APPLICATIONS

This application is a continuation application of U.S. application Ser. No. 17/017,503 filed on Sep. 10, 2020, and entitled Compact Galvanometer Mirror Design, which is a non-provisional application based on and claims benefit of priority to U.S. provisional patent application No. 62/898,455 filed on Sep. 10, 2019, and entitled Compact Galvanometer Mirror Design, all of which are incorporated herein by reference in their entireties.

BACKGROUND

Light detection and ranging (LIDAR) is a technology that measures a distance to an object by projecting a laser toward the object and receiving the reflected laser. In various implementation of LiDAR systems, a light source illuminates a scene. The light scattered by the objects of the scene is detected by a photodetector or an array of photodetectors. By measuring the time it takes for light to travel to the object and return from it, the distance may be calculated. A LiDAR system may use a number of different ranging methods, including pulsed time of flight, phase shift, and frequency modulation.

SUMMARY

Implementations described and claimed herein provide a mechanically-scanning 3-dimensional light detection and ranging (3D LiDAR) system including a galvo mirror assembly, wherein the galvo mirror assembly includes a mirror attached to an armature of a galvanometer to reflect a light signal generated by a light generator, at least one permanent magnet, and at least one coil configured to carry a current to move the armature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTIONS

A limitation of high performance LiDAR systems is size of the collection aperture for collecting return light. Specifically, the design of galvo mirror and spinning polygonal mirror disclosed herein enables a very large collection aperture while maintaining a compact design for overall device form factor. An implementation of the galvo mirror disclosed herein is allows the magnetics and coil of the galvo to reside completely behind the mirror surface itself In one implementation, the galvo mirror is mounted to a voice coil motor. The combination of the mirror and the voice coil motor together may be referred to as the "galvo" or the "galvo mirror," which can be replaced by other optical elements for scanning, such as a grating. Implementations described and claimed herein also provide a mechanically-scanning 3-dimensional light detection and ranging (3D LiDAR) system (also used to refer a light imaging, detection, and ranging system) using such galvo mirror assembly. Specifically, the implementations disclosed herein provides a rotating scanning mirror, in particular a polygon that receives light reflected by the galvo mirrors. In various implementations, other mechanical or non-mechanical scanning techniques can be paired with the galvanometer mirror design disclosed herein for two-dimensional scanning.

In one implementation, the galvo motor that is attached to the galvo mirror is mounted in a housing. Alternatively, the galvo motor may be housed in a large cylinder, adjacent to the mirror along the axis of rotation. In other implementations, a motor is located directly behind the mirror surface, which provides for a minimally sized overall scanning system.

Figure 1:
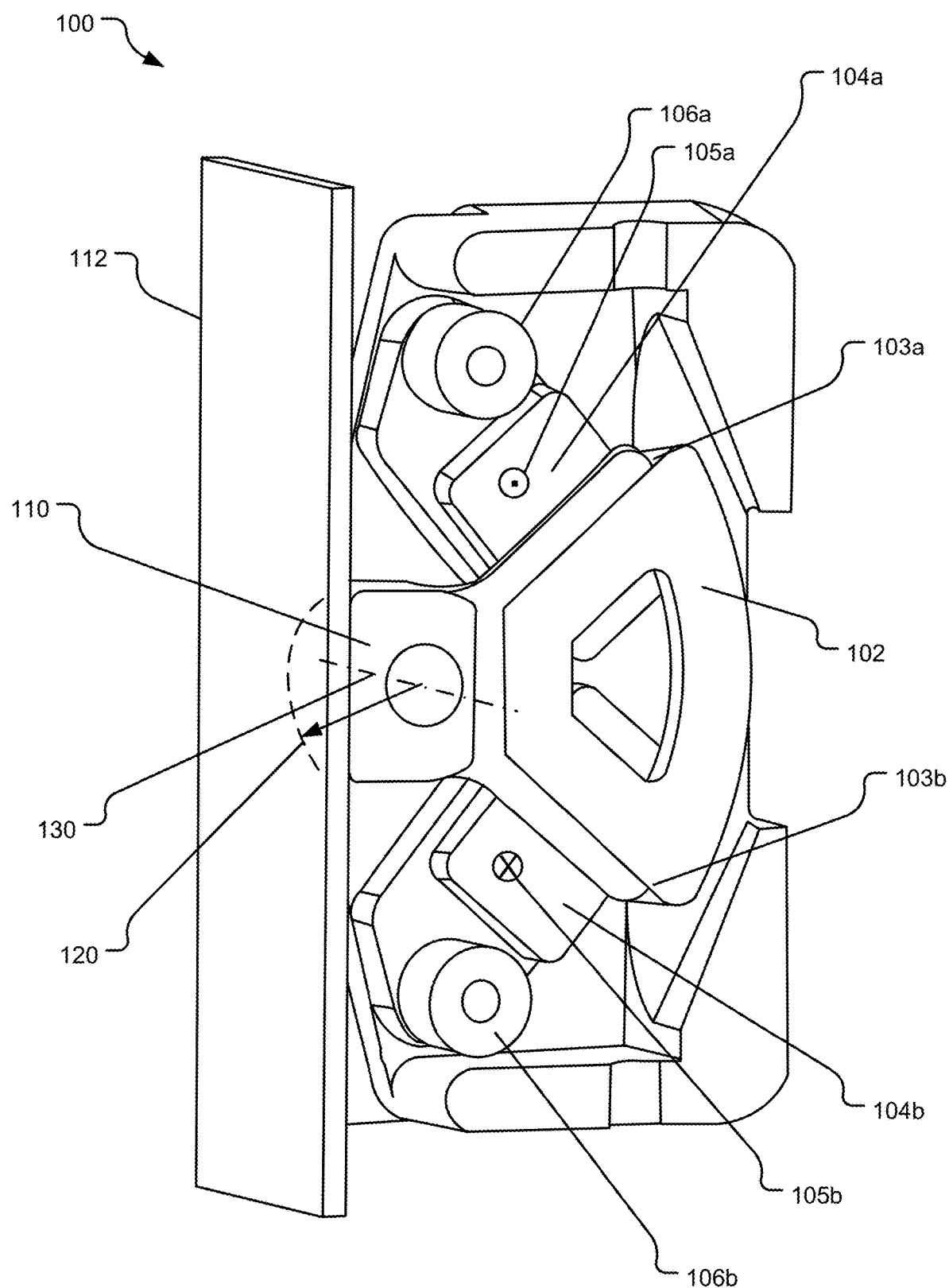
FIG. 1 illustrates a cutaway view of an example implementation of a galvo mirror assembly including a galvo mirror attached to an armature.

FIG. 1 illustrates a cutaway view of an implementation of a galvo mirror assembly 100 including a galvo mirror 112 attached to an armature 110 of a galvo motor assembly. Specifically, FIG. 1 illustrates two of four magnets that maybe used in the galvo mirror assembly 100. The galvo mirror assembly 100 also includes pole pieces 106a and 106b to close the magnetic field path. Alternatively, only 2 magnets 304a,b without using 304c,d. Such an assembly could lower the cost at the expense of more complex control algorithms outside the scope of this disclosure to deal with magnetic field lines that are not strictly perpendicular to the plane of rotation of the coil. Alternatively, two magnets may be combined into one structure while preserving the magnetic properties.

The galvo motor assembly may include at least one permanent magnet. Specifically, the illustrated implementation includes two permanent magnets 104a and 104b configured on two sides of a coil 102. The coil 102 may, for example, have a trapezoidal shape. In one implementation, the permanent magnets 104a and 104b may be replaced by non-permanent or electromagnets. As illustrated, the permanent magnets 104a, 104b may be configured in a surface underneath a surface where the coil 102 is configured. Furthermore, the coil 102 is configured between two coil support arms 103a and 103b. The coil support arms 103a and 103b may be made of any non-magnetic material, such as aluminum, plastic, copper, etc. The application of the current to the coil 102 in the presence of the magnetic field established by magnets 104a, 104b induces a force on the coil 102 perpendicular to the current flow and the magnetic field lines, leading to the armature containing the coil 102 to rotate about its axis 130 in accordance with the Lorentz Force Law, where force is a function of the charge generated by the current, velocity of the charge, and the magnitude of the magnetic field. The magnetic field that passes through the permanent magnets 104a and 104b is in the directions indicated by 105a and 105b, i.e., in directions perpendicular to the page of FIG. 1.

As the current is provided to the coil 102, given the presence of the permanent magnets 104a and 104b, the armature 110 rotates along an arc, such as an arc 120 illustrated with dotted lines. Given the armature 110 is fixedly attached to the galvo mirror 112, the galvo mirror also rotates along the arc 120. In one implementation, the galvo motor assembly may be configured such that the galvo mirror 112 spans a range of as much as sixty (60) degrees along an axis that is perpendicular to the page of FIG. 1. Furthermore, the axis of rotation of the galvo mirror 112 is also perpendicular to an axis of rotation of a polygon mirror (further disclosed in the following figures).

Figure 2:
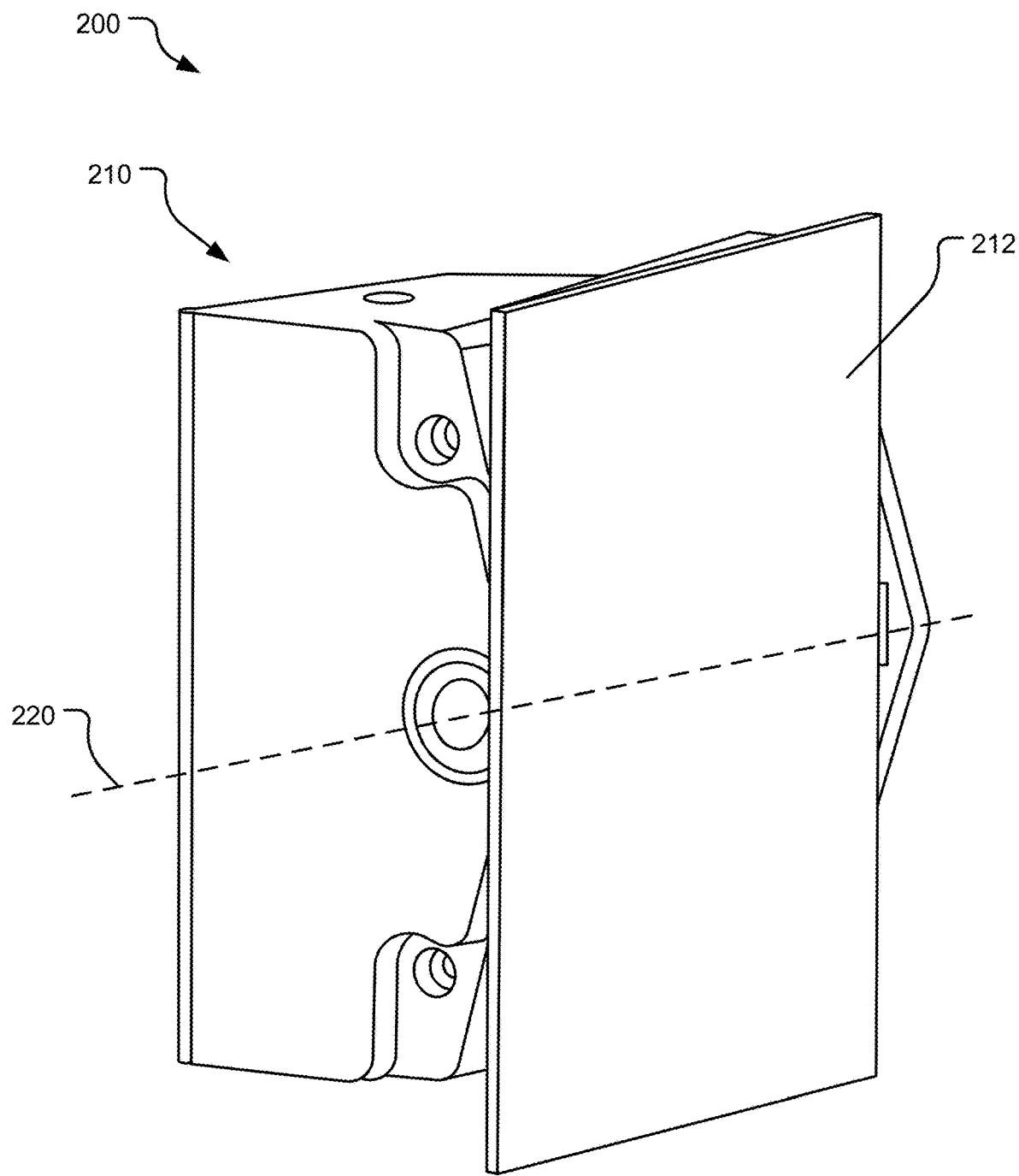
FIG. 2 illustrates a front view of an example galvo mirror assembly disclosed herein.

FIG. 2 illustrates a front view of an galvo mirror assembly 200 disclosed herein. Specifically, the galvo mirror assembly 200 includes a galvo motor assembly 210 that is attached to the back of a galvo mirror 212. The galvo motor assembly 210 may include one or more permanent magnets such as the permanent magnets 104a, 104b disclosed in FIG. 1, an armature such as an armature 110 disclosed in FIG. 1, and a coil to carry current, such as the coil 102 disclosed in FIG. 1. In response to application of current to the coil, the galvo motor assembly rotates the galvo mirror around an axis 220.

Figure 3:
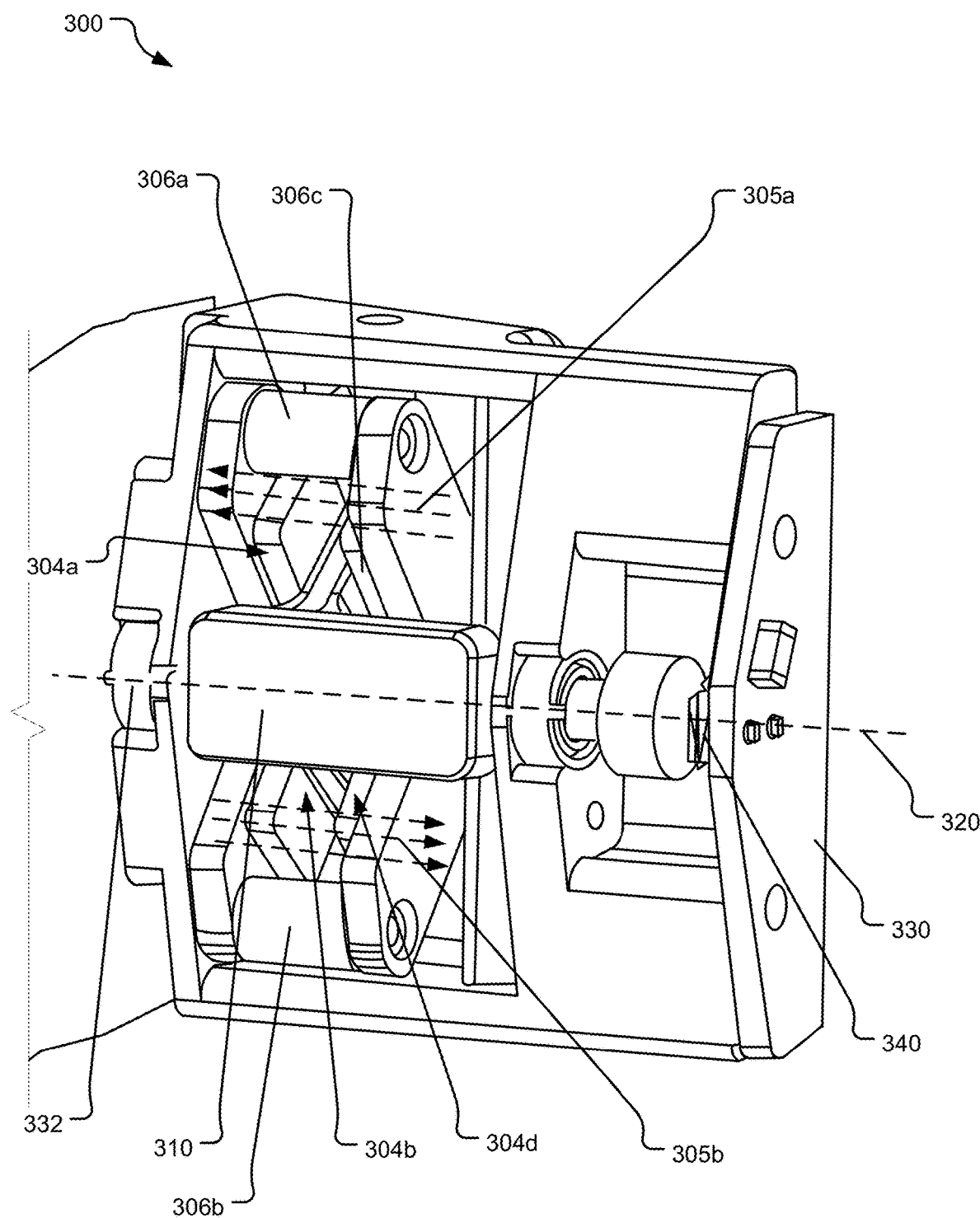
FIG. 3 illustrates an alternate view of the example galvo assembly disclosed herein with a mirror removed.
Figure 4:
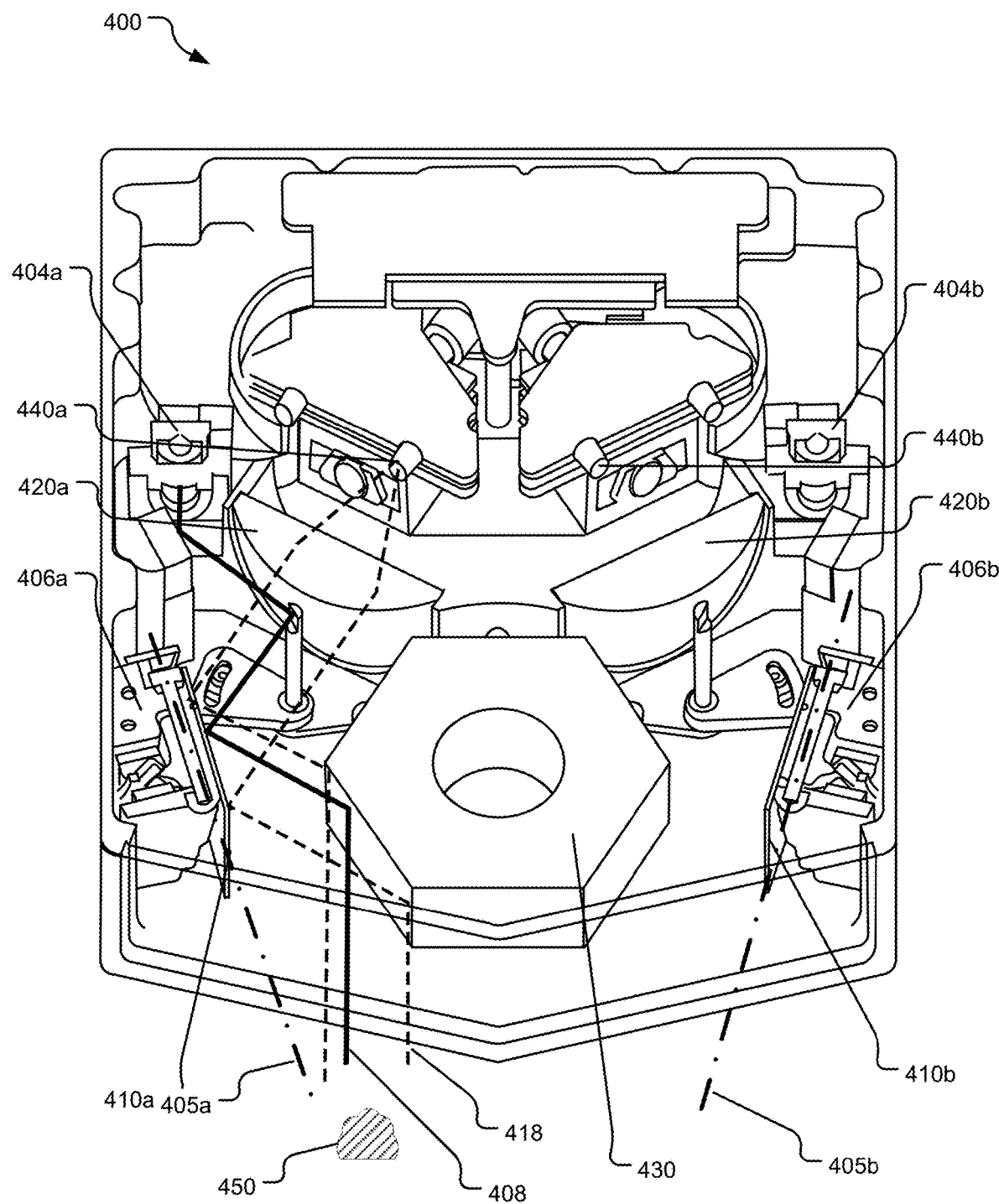
FIG. 4 illustrates an example 3-D rendition of a two galvo mirror assemblies with a polygonal mirror.

FIG. 3 illustrates an alternate view of a galvo mirror assembly 300 disclosed herein. The galvo mirror assembly 300 includes an armature 310 that is attached to back side of a galvo mirror (not shown) that is configured to reflect light from a light source towards a polygonal mirror. The armature 310 is configured to be rotated in response to application of current to a coil. A printed circuit board (PCB) 330 may be attached to the galvo mirror assembly 300 with a sensor chip 340 to provide the function of an encoder to sense the position of the mirror and communicate the angle to a controller device. The coil is configured between permanent magnets 304a, 304b, 304c, and 304d. In one implementation, the magnets 304a and 304b are configured in an arc shape around the coil and similarly the magnets 304c and 304d are also configured in an arc shape around the coil. An application of current to coil in the presence of the magnetic field established by magnets 304a, 304b, 304c, and 304d induces a force on the coil perpendicular to the current flow and the magnetic field lines 305a, 305b, leading to the armature 310 to rotate about its axis 320. Pole pieces 306a and 306b may be used to close the path of the magnetic field and the armature 310 may be configured to rotate around a shaft that is attached to the galvo mirror using a bearing 332. FIG. 4 illustrates a 3-D rendition of a LiDAR system 400 implemented using galvo mirrors 410a and 410b and a polygonal mirror 430. Specifically, the LiDAR system 400 includes light sources such 404a and 404b that generate a light beam that is directed towards the galvo mirrors 410a and 410b. The galvo mirrors 410a and 410b are implemented using galvo motor assemblies 406a and 406b such that they are able to rotate around axes 405a and 405b. Specifically, the galvo motor assemblies 406a and 406b are attached to the back of galvo mirrors 410a and 410b. The galvo mirrors 410a and 410b reflect the light beam 408 towards the polygonal mirror 430.

Light 418 reflected back from objects 450 is reflected by the polygonal mirror 430 towards the galvo mirror 410a. In turn, the galvo mirror 410a reflects the light beam 418 via lens 420a and towards detector 440a.

Figure 5:
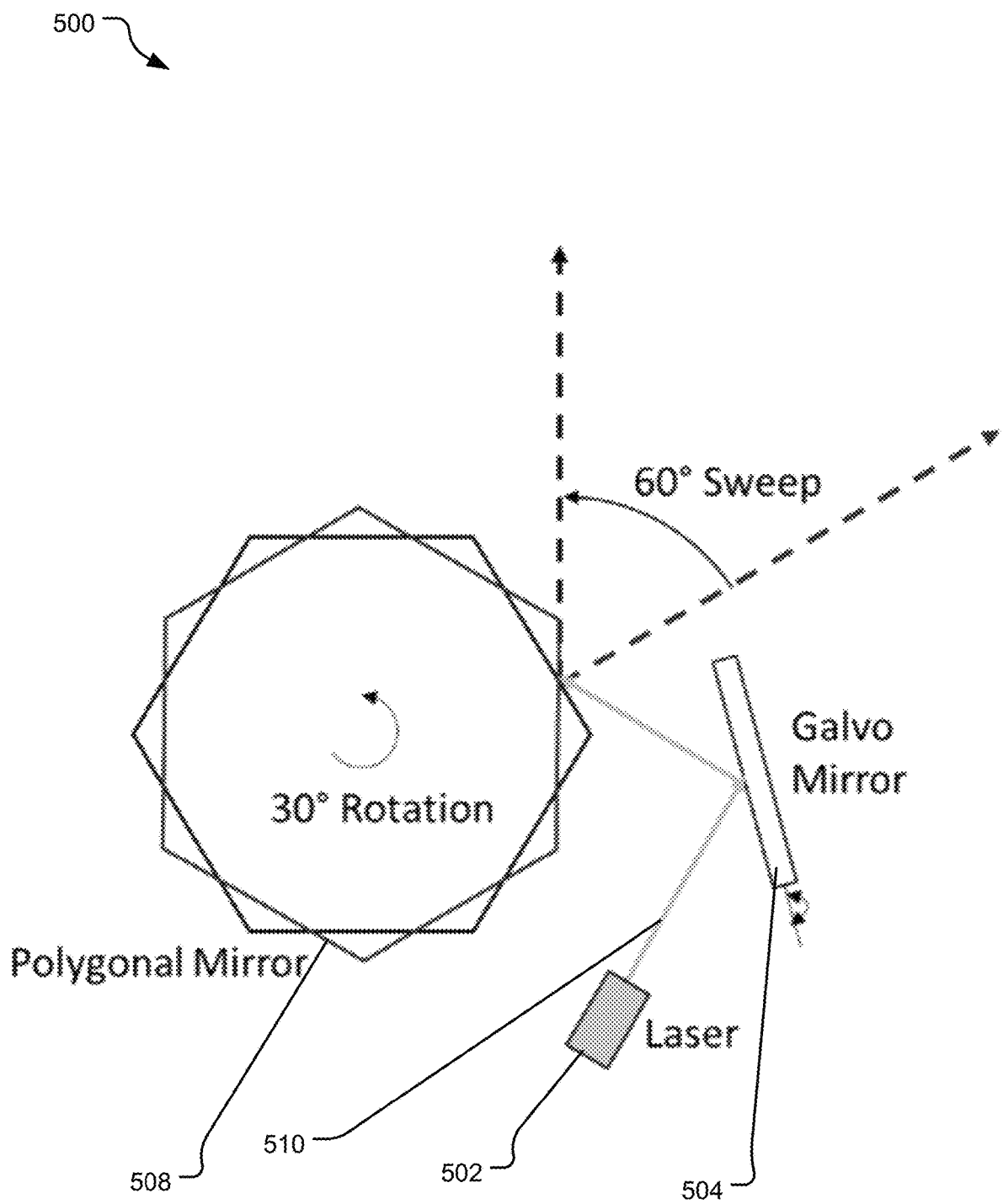
FIG. 5 illustrates an example configuration of a galvo mirror and a polygonal scanning mirror.
Figure 6:
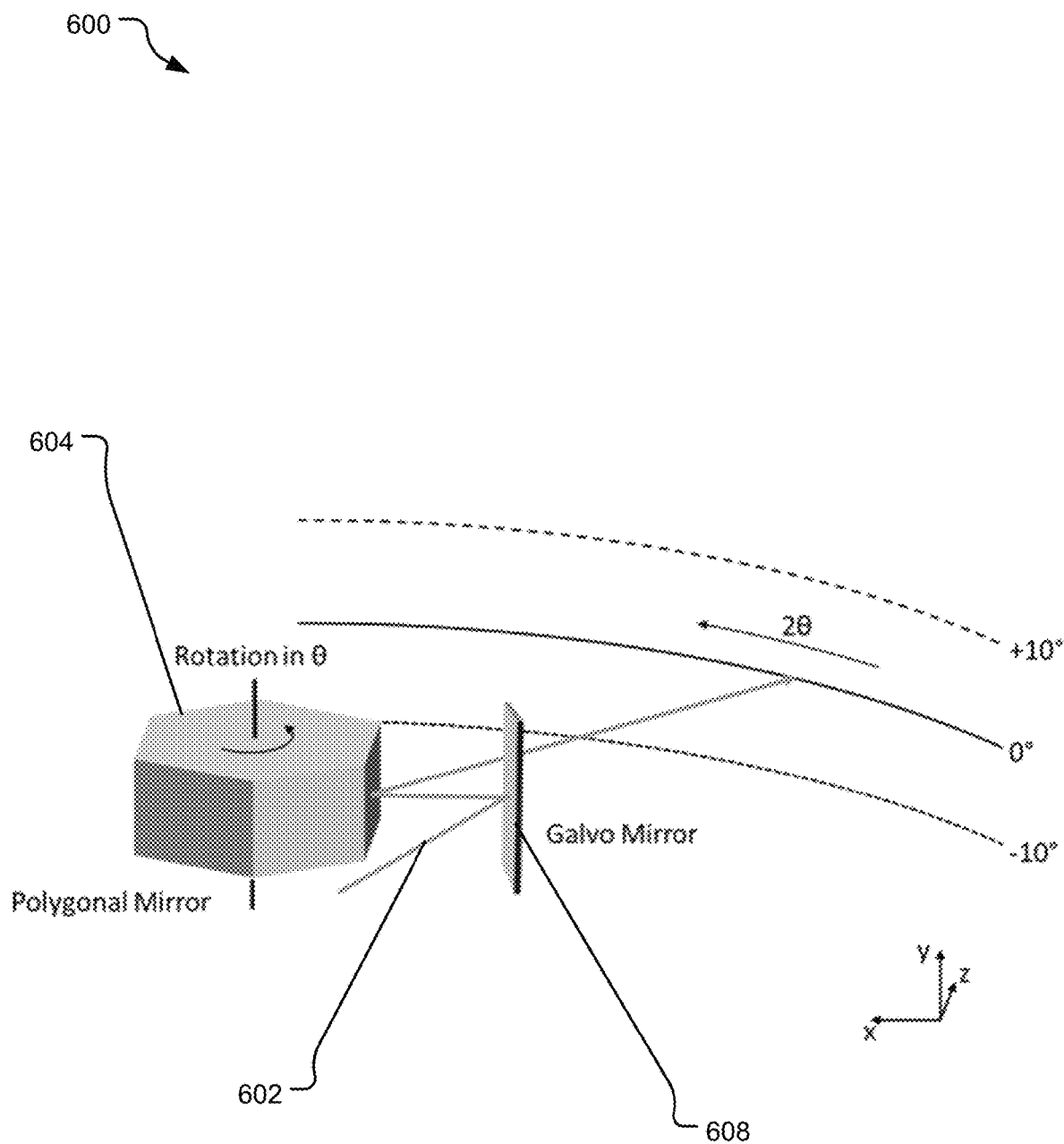
FIG. 6 illustrates an example three-dimensional rendition of a configuration of galvo mirror and a polygonal scanning mirror.

Shown in FIGS. 5 and 6 is the potential utility of this galvo design in a potential LiDAR system, enabling the galvo optics for LiDAR to not extend above or below the mirror, while minimizing the depth of the actuation system behind the mirror, while wholly being contained behind the plane of the mirror, for added benefit of not blocking the optical path.

Specifically, FIG. 5 illustrates a configuration 500 of a galvo mirror 504 and a polygonal scanning mirror 508 used in a LiDAR system. The galvo mirror 504 may be installed on a galvo assembly such that it can rotate around an axis that is perpendicular to the plane of FIG. 5. A light beam 510 generated by a light source 502 such as a laser generator is reflected by the galvo mirror towards the polygonal mirror 508.

FIG. 6 illustrates a three-dimensional rendition 600 of a configuration of galvo mirror and a polygonal scanning mirror. Specifically, a light beam 602 may be reflected by a galvo mirror 608 towards a polygonal mirror 604.

While any number of galvo mirrors 608 can be paired with the polygonal mirror 604 (n-sides) or other scanning system (or by itself, for that matter), only one reference design may be of particular interest. Of note in this geometry, again, is the size of the galvo mirror 608 surface may be comparable to size of the polygonal mirror 604 surface.

Figure 7:
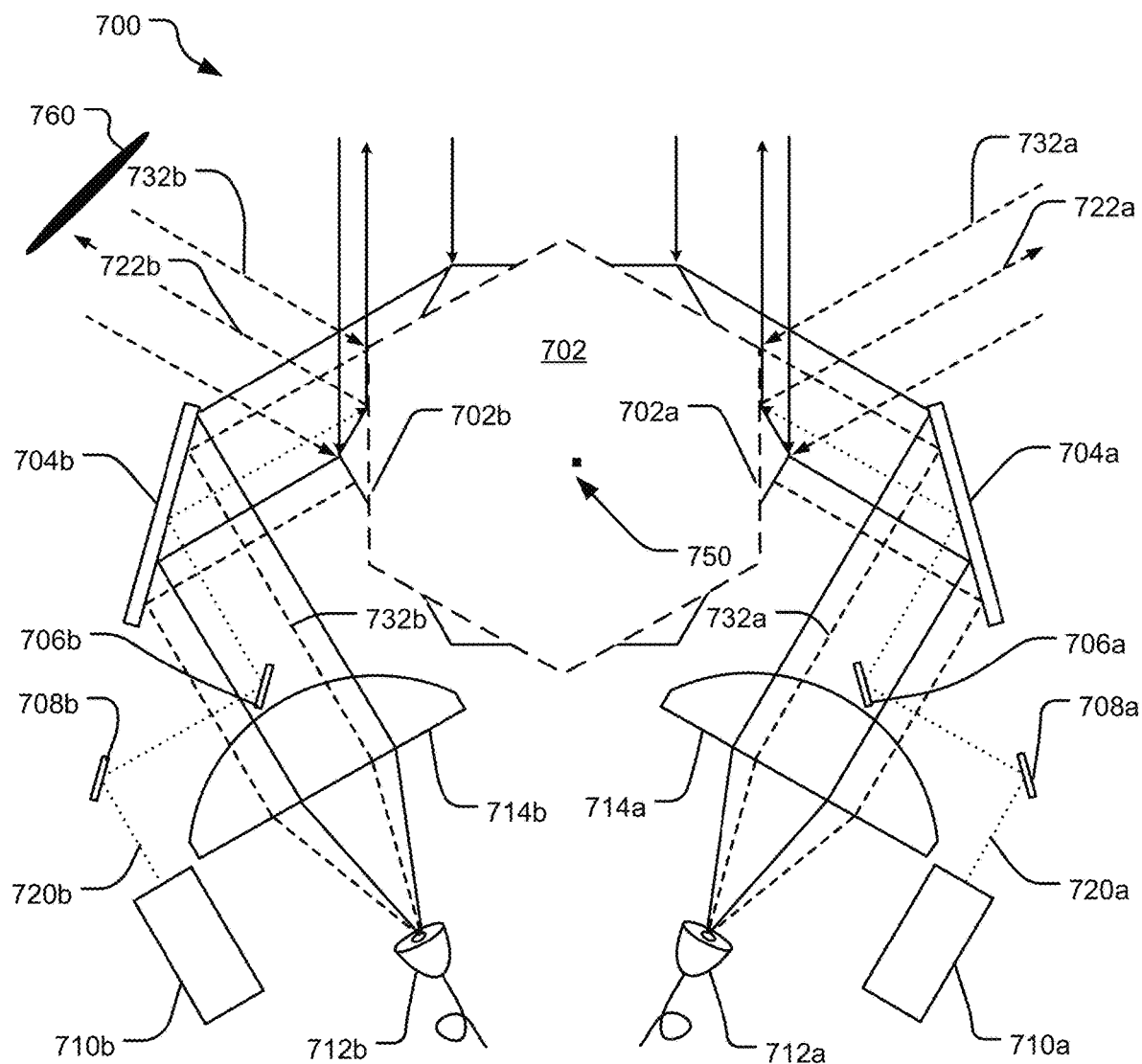
FIG. 7 illustrates an example of a dual-channel LiDAR system using two galvo mirrors configured in a manner disclosed herein.
Figure 7:
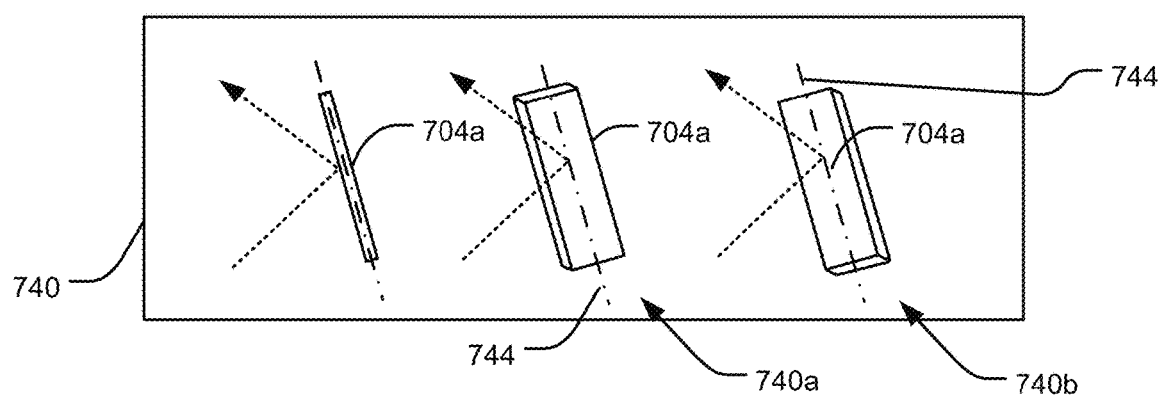

FIG. 7 discloses a configuration of a dual channel mechanically scanning LiDAR 700 including the galvo mirrors disclosed herein and a polygonal rotating scanning mirror 702. The mode of operation of the mechanically scanning LiDAR 700 is as follows: Laser sources 710 emit light beam 720, which may be pulsed or continuous. The light beam 720 is reflected by auxiliary mirrors 708 and 706 towards vertically scanning mirrors 704 (also referred to as "galvo mirrors 704"). The vertically scanning mirrors 704 rotate about an axis or rotation that is the plane of the page of FIG. 7. Example rotation of the mirror 704a around an axis 744 in the plane of the page is illustrated at 740. Specifically, at 740a, the mirror 704a is rotated counter-clockwise around the axis 744 whereas at 740b, the mirror 704a is rotated clockwise around the axis 744. The axis 744 may be at the front of back surface of the mirror 704a or in front of or behind the surface of the galvo mirror 704a.

After reflection from the vertical scanning mirrors 704, the light beam 720 then bounces off the rotationally scanning mirror 702. The rotationally scanning mirror 702 may be in the shape of a polygon with n sides. In FIG. 7, the rotationally scanning mirror 702 is a hexagon with six sides 702a, 702b, etc. In alternative implementations, the rotationally scanning mirror 702 may be a 3-, 4-, 5-, or 7-sided polygonal mirror. The rotationally scanning mirror 702 may rotate around an axis 750 that is into the page of FIG. 7. Thus, the axis 750 of the rotationally scanning mirror 702 is orthogonal to the axis 744 of the galvo mirrors 704. As the rotationally scanning mirror 702 rotates, the angle of reflection changes dependent on the angle of the rotation scanning mirror. Thus, the rotationally scanning mirror 702 effectively scans the light beam 720 horizontally in the plane of the page of FIG. 7, while the vertically scanning mirrors 704 effectively scans the light beam 720 vertically out of the page. However, when the full vector ray tracing is performed, a small component of the light beam 720 from the vertical scanning mirror 704 is scanned within the page (horizontally).

Due to contributions of both mirrors, the laser light beam therefore scans in two largely independent dimensions, allowing for a raster scan across the field of view of the mechanically scanning LiDAR 700. The light beam 720 reflected from the rotationally scanning mirror 702 is shown by 722, which after colliding with an object 760 may back scatter towards the mechanically scanning LiDAR 700. The back scattered light beam 732 reflects off of the rotationally scanning mirror 702 and the galvo mirror 704 towards collection lens 714. The collection lens 714 focuses the backscattered light beam 732 towards a detector 712. Note that the detector 712 may be one of a single element detector or a multiple element detector.

For example, the rotationally scanning mirror 702 may be rotating at a speed in the range of a few thousand revolutions per minute (RPM). On the other hand, the galvo mirror 704 may rotate at a speed of 10's of Hz, however, it does not revolve completely around its axis. Assuming that not too much time has passed, the backscattered light beam 732 which makes it to the mechanically scanning LiDAR 700 then reflects off the rotationally scanning mirror 702, followed by the vertically scanning mirror 704, and eventually travels through the collection lens 714. In the implementation disclosed in FIG. 7, two optical scanning and detection modules are present, except for the rotationally scanning mirror 702, which is shared by each of the two optical scanning and detection modules.

It is understood that the actual implementation of the mechanically scanning LiDAR 700 need not fit the precise geometric configuration as pictured in FIG. 7. In alternative implementations, the angles and component arrangements may be different than that disclosed in FIG. 7.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A device comprising:
   a galvo mirror assembly including a galvo mirror attached to an armature of a galvanometer to reflect a light signal generated by a light generator,
   wherein the galvanometer comprising:
      at least one permanent magnet, and
      at least one coil configured to carry current to move the armature,
   wherein the galvo mirror is configured to reflect the light signal generated by the light generator towards a one or more objects and the galvo mirror is further configured to reflect light signal reflected from the one or more objects towards a light detector.

2. The device of claim 1, wherein the galvanometer further comprising at least two permanent magnets, each of the two permanent magnets configured in an arc shape around at least one coil.

3. The device of claim 1, wherein the galvo mirror is configured to rotate in a range of up to sixty (60) degrees.

4. The device of claim 1, wherein the armature is configured to rotate along an arc.

5. The device of claim 1, further comprising a printed circuit board (PCB) attached to the galvo mirror assembly, the PCB including a sensor chip configured to sense a position of the galvo mirror.

6. The device of claim 5, wherein the PCB is further configured to communicate the a position of the galvo mirror to a controller.

7. The device of claim 1, wherein the armature is attached to a back side of the galvo mirror.

8. The device of claim 2, wherein each of the two permanent magnets are configured behind a surface of the galvo mirror.

9. A galvo mirror assembly, comprising:
   a galvo mirror attached to an armature of a galvanometer to reflect a light signal generated by a light generator, wherein the galvanometer comprising:
      at least one permanent magnet, and
      at least one coil configured to carry current to move the armature, wherein the galvo mirror is configured to reflect the light signal towards a polygonal mirror.

10. A galvo mirror assembly, comprising:
    a galvo mirror attached to an armature of a galvanometer to reflect a light signal generated by a light generator, wherein the galvanometer comprising:
       at least one permanent magnet, and
       at least one coil configured to carry current to move the armature, wherein the galvo mirror is configured to reflect the light signal generated by the light generator towards a one or more objects and the galvo mirror is further configured to reflect light signal reflected from the one or more objects towards a light detector.

11. A device comprising:
    two galvo mirror assemblies, each of the two galvo mirror assemblies including a galvo mirror attached to an armature of a galvanometer, wherein the galvanometer comprising:
       at least one permanent magnet, and
       at least one coil configured to carry current to move the armature,
    wherein the galvo mirror is configured to reflect the light signal generated by the light generator towards a one or more objects and the galvo mirror is further configured to reflect light signal reflected from the one or more objects towards a light detector.

12. The device of claim 11, wherein each of the two galvo mirror assemblies further comprising at least two permanent magnets, each of the two permanent magnets configured in an arc shape around at least one coil.

13. The device of claim 11, wherein each of the two permanent magnets are configured behind a surface of the galvo mirror.

14. The device of claim 11, wherein each of the two galvo mirror assemblies further comprising a printed circuit board (PCB) attached to the galvo mirror assembly, the PCB including a sensor chip configured to sense a position of the galvo mirror.

* * * * *